United States Patent [19]

Hachiya et al.

[11] 3,985,464
[45] Oct. 12, 1976

[54] SPINNING RESERVE DEVICE FOR A WATER-WHEEL

[75] Inventors: Takeo Hachiya; Keiichi Hagiya, both of Hitachi, Japan

[73] Assignee: Hitachi, Ltd., Japan

[22] Filed: Sept. 25, 1974

[21] Appl. No.: 509,265

[30] Foreign Application Priority Data

Sept. 26, 1973 Japan .............................. 48-107470

[52] U.S. Cl. .................................... 415/1; 415/175
[51] Int. Cl.² ........................................... F01D 1/06
[58] Field of Search ............... 415/1, 110, 111, 112, 415/175, 176, 168, 121 A

[56] References Cited
UNITED STATES PATENTS

| 3,174,719 | 3/1965 | Sproule et al. .................... 415/110 |
|---|---|---|
| 3,239,193 | 3/1966 | Kerensky ............................ 415/110 |
| 3,253,816 | 5/1966 | Sproule ................................ 415/1 |
| 3,724,966 | 4/1973 | Sproule ................................ 415/1 |

FOREIGN PATENTS OR APPLICATIONS

| 685,965 | 5/1964 | Canada ............................... 415/110 |
|---|---|---|
| 4,639,671 | 11/1968 | Japan ..................................... 415/1 |
| 4,429,931 | 7/1966 | Japan ................................. 415/110 |

Primary Examiner—Henry F. Raduazo
Attorney, Agent, or Firm—Craig & Antonelli

[57] ABSTRACT

A device whereby water leaking through the guide vanes while the water-wheel is in spinning reserve can be drained through leak drain pipes which open in the fixed member near the outer periphery of the runner.

6 Claims, 1 Drawing Figure

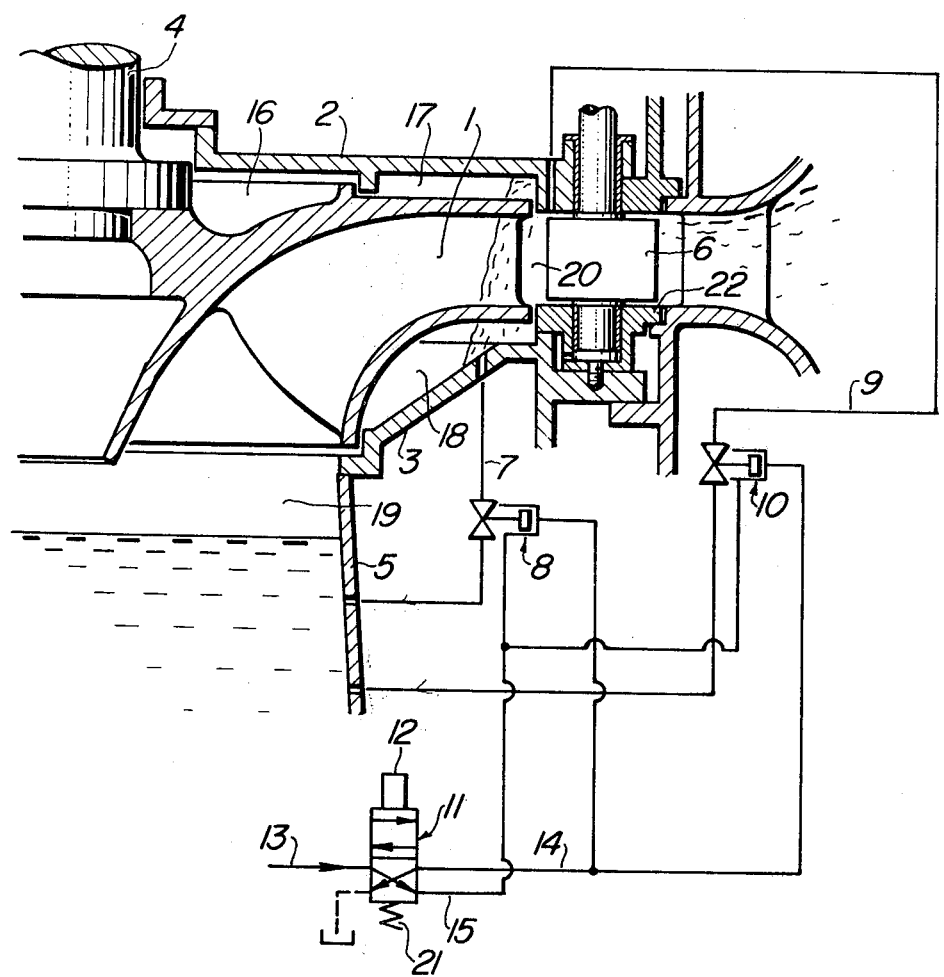

SPINNING RESERVE DEVICE FOR A WATER-WHEEL

BACKGROUND OF THE INVENTION

1. Field of the Invention

This invention relates to a device for rotating a water-wheel in the air by an electric motor while the water-wheel is in spinning reserve.

2. Description of the Prior Art

A water-wheel may be placed in spinning reserve besides being operated for producing electric power or performing a pumping operation. When a water-wheel is placed in spinning reserve, compressed air is introduced into the runner chamber of the water-wheel to move downwardly the liquid level of water in the runner chamber and the runner is rotated in the compressed air by a generator-motor. A water-wheel is placed in spinning reserve to attain several ends. For example, it will be placed in spinning reserve for purposes of reducing the starting torque of the generator-motor when a pumping operation is begun or letting it stand by to be ready for switching immediately to a condenser operation for improving the power-factor of the transmission system, electric power producing operation or pumping operation.

While the water-wheel is in spinning reserve, the inlet valve mounted on the water line for introducing water into the runner chamber or draining water therefrom is in a closed position, and a plurality of guide vanes provided on the outer periphery of the runner for its entire circumferential extent and disposed in face-to-face relation with the runner are fully closed, so as to ensure that compressed air is filled in the runner chamber. However, although the guide vanes are fully closed, water will pass into the runner chamber by leaking through the gaps between the guide vanes, with the leakage increasing due to wear of the component parts and other factors as the result of prolonged operation of the water-wheel.

The invasion of the runner chamber by the leak means that the water in the casing between the inlet valve and the guide vanes and in the water line is replaced by the air in the runner chamber. The presence of air in the casing and water line causes a trouble when the water-wheel is switched from spinning reserve to a normal operation condition. To obviate this disadvantage, means is provided for providing an additional supply of water to compensate for the leak. Such means generally comprises a water conduit connecting a portion of the water line disposed above the inlet valve and nearer to the dam to portions of the water line and the casing nearer to the runner than the inlet valve by bypassing the inlet valve, and a valve generally referred to as a throttling and water supplementing valve which is mounted in the water conduit to reduce pressure.

In recent years, water-wheels have shown a tendency to have a high head and a great capacity. As a result, the pressure in the water line rises. This cause the leakage through the guide vanes into the runner chamber to increase.

If the volume of water leaking through the guide vanes into the runner chamber is great, the resistance offered to the rotation of the runner will be increased. This means that it is necessary to increase the capacity of the motor for driving the runner. To obviate this disadvantage, leak drain pipes for discharging the water passing into the runner chamber through leaks are mounted on the lower cover of the runner chamber and open at one end therein and at the other end in the draft tube, for example.

In the case of a pump water-wheel, the runner has a very high peripheral velocity in addition to an increased leakage of water due to an increase in the head. This increases the pressure applied to the outer periphery of the runner, and causes the water in the periphery of the runner to move with the runner, with a result that a vortex flow of high magnitude is produced and makes it difficult for the water to find its way between the outer periphery of the runner and the guide vanes. Thus, the water under pressure remains between the outer periphery of the runner and the guide vanes.

The fact that the area of opening of each of the aforementioned leak drain pipes cannot be increased is an important factor in this phenomenon. If the area of opening of each leak drain pipe could be increased, it would be possible to drain the water leaking through the guide vanes into the runner chamber to an extent such that no great difficulty is experienced in placing the water-wheel in spinning reserve. However, since the pipes open on the surface of the water flow passageway, it is impossible to increase the area of opening of each drain pipe without any restriction by disregarding the fact that the increase adversely affects the normal operation of the water-wheel for producing electric power or functioning as a pump. There are also limits to the number of openings.

To sum up, the increase in the head and size of water-wheels which has been realized in recent years is such that it is impossible to satisfactorily drain the water leaking through the guide vanes by increasing the area of openings of the leak drain pipes without interfering with the normal operation of the water-wheels to produce electric power or function as pumps. The water leaking through the guide vanes offers great resistance to the rotating runner. This will make it necessary to increase the size of the electric motor for driving the runner or cause disturbances in the current of the system.

In ordinary pump water-wheels, the compressed air supplied to the runner chamber is vented therefrom between the outer periphery of the runner and the guide vanes. However, since there is water under pressure in the outer periphery of the runner as aforementioned, the prior art has the disadvantages of not being able to drain the leak satisfactorily and of the temperature rising in the runner chamber.

The drawbacks of the prior art mentioned above can of course be somewhat obviated by reducing the volume of water leaking through the guide vanes by increasing the degree of precision with which the guide vanes are worked on and assembled. However, a prolonged use of the guide vanes inevitably results in an increase in the volume of water leaking therethrough.

It is known from our experience that the water-wheels which need attention in this respect are those which have a head of over 500 meters and that the runner of each water-wheel has a peripheral velocity of over 100 m/sec. In fact, there is no problem of draining of leak in pump water-wheels which have a head and a peripheral velocity below the aforementioned level, and draining of leak has been satisfactorily carried out through the leak drain pipes whose openings are increased to the allowable limits.

SUMMARY OF THE INVENTION

This invention has as its object the provision of a device whereby water can be drained and air can be vented smoothly from pump water-wheels of a high head and high lift whose runner has a high peripheral velocity while such water-wheels are being in spinning reserve. According to the invention, this object is accomplished by constructing the drain pipes such that they also open in the upper cover between the outer periphery of the runner and the guide vanes in order to increase the number of drain pipes for draining water leaking through the guide vanes into the runner chamber when the water-wheel is in spinning reserve.

BRIEF DESCRIPTION OF THE DRAWING

The drawing is a sectional view of the runner section of the water-wheel incorporating the present invention therein.

DESCRIPTION OF A PREFERRED EMBODIMENT

In the drawing, 1 is a runner of the Francis type which is directly connected through a main shaft 4 to a generator-motor (not shown). 2 refers to an upper cover which is in spaced juxtaposed relation with an upper surface of the runner 1 to define therebetween an inner back pressure chamber 16 and an outer back pressure chamber 17. A leak drain pipe 9 is shown as opening at one end thereof in a portion of the upper cover 2 which is disposed between outer periphery of the runner 1 and one of a plurality of guide vanes 6 arranged for the entire circumferential extent of the outer periphery of the runner 1.

3 designates a lower cover which is in spaced juxtaposed relation with an underside of the runner 1 to define therebetween a lateral pressure chamber 18. At least one leak drain pipe 7 opens at one end thereof in a portion of the lower cover 3 which is on the lateral pressure chamber 18 side. 5 is a draft tube disposed below the runner 1 and connected to the lower cover 3. The leak drain pipes 7, 9 open at the other end thereof in suitable positions in the draft tube 5. Although only one drain pipe 9 is shown, it is to be understood that a plurality of drain pipes 9 are provided.

8 designates a leak drain valve mounted in the leak drain pipe 7 and adapted to be opened and closed by hydraulic pressure so as to connect and disconnect the lateral pressure chamber 18 to and from the draft tube 5. 10 refers to a leak drain valve mounted in one of the leak drain pipes 9 and adapted to be opened and closed by hydraulic pressure so as to connect and disconnect to and from the draft tube 5 a chamber 20 defined between the outer periphery of the runner 1 and the guide vanes 6. It is to be understood that the leak drain pipes may be combined into a single drain pipe so that only one leak drain valve may be used.

11 designates an electromagnetic change-over valve comprising a change-over port, an electromagnet 12 and a spring 21 and adapted to supply fluid under pressure from a pressure fluid line 13 to a pressure fluid line 14 or 15 (line 13 is shown in the drawing as connected to line 15). Pressure fluid line 14 is connected to a closed side of the leak drain valves 8 and 10 while pressure fluid line 15 is connected to an open side thereof. Thus, the drawing shown the leak drain valves 8 and 10 in open positions. 22 is a bottom ring for supporting a stem of the guide vanes 6.

In placing the water-wheel in spinning reserve from the normal operation condition, the guide vanes 6 are first closed and then an inlet valve (not shown) is closed. Compressed air is supplied from a compressed air chamber (not shown) to a runner chamber 19 while the runner 1 is rotating or after its rotation is interrupted, so as to move downwardly the liquid level of water in the runner chamber 19 to keep it out of touch with the runner 1 as shown.

When the water wheel is placed in spinning reserve from its operation for producing electric power, the generator-motor is cut off from the system. However, when it is placed in spinning reserve from its pumping operation, the generator-motor need not be cut off from the system because it acts as an electric motor.

The water wheel is thus placed in spinning reserve when the runner 1 is rotated after the liquid level in the runner chamber 19 is moved downwardly as shown. As aforementioned, water leaks through gaps between the guide vanes and the runner and the leak is collected as water under high pressure in a chamber 20 disposed on the outer periphery of the runner 1 as the number of revolutions of the runner 1 increases. The water under pressure collected in the chamber 20 offers resistance to the rotating runner 1. To obviate this drawback, the electromagnet 12 of the electromagnetic change-over valve 11 is energized to connect pressure fluid line 13 to pressure fluid line 15 as shown to thereby open the leak drain valves 8 and 10. (Generally, the leak drain valves are opened as soon as feed of compressed air to the runner chamber 19 is initiated.)

Upon the leak drain valves 8 and 10 being opened, the water under pressure in the chamber 20 is drained through the drain pipes 9 to the draft tube 5, while water under pressure passing into the lateral pressure chamber 18 is drained through the drain pipe 7 to the draft tube 5. That is, when the number of revolutions of the runner 1 is at a low level, the vortex flow of the water in the chamber 20 caused by the rotation of the runner 1 is low in magnitude and the volume of water passing into the lateral pressure chamber 18 is large, so that the water is mainly drained through the drain pipe 7. However, when the number of revolutions of the runner 1 increases, the water moving in vortex flow with the rotating running 1 is so high in magnitude that the volume of water passing into the lateral chamber 18 is reduced, with a result that the water is mainly drained through the drain pipes 9.

The water under pressure in the chamber 20 is drained through the leak drain pipes 9 extending through the upper cover 2. This is because it is difficult to connect the pipes 9 to the chamber 20 through the lower cover 3 due to the fact that the bottom ring 22 is provided on the lower cover 3 side.

From the foregoing description, it will be appreciated that according to the present invention it is possible to increase the area of opening of each leak drain pipe without interfering with a normal operation of the water-wheel. Moreover, the drain pipes open in the chamber interposed between the runner and the guide vanes. Thus, it is possible to effectively drain water even if the volume of water leaking through the guide vanes into the runner chamber increases, so that an increase in the resistance offered to the rotating runner can be prevented. Additional advantages offered by the invention are that an increase in the temperature in the runner chamber 19 can be minimized and the capacity of the generator-motor can be reduced.

We claim:

1. A spinning reserve device for a water-wheel comprising:
    a runner of the Francis type;
    an upper cover in spaced juxtaposed relationship with an upper surface of the runner;
    a lower cover in spaced juxtaposed relationship with an underside of the runner;
    a plurality of pivoted guide vanes arranged on the outer periphery of said runner for the entire circumferential extent and in the closed position to define an annular chamber between the guide vanes and said runner;
    a plurality of leak drain pipes opening in the upper cover interposed between the outer periphery of said runner and said guide vanes defining said chamber;
    a plurality of leak drain valves each mounted in one of said leak drain pipes; and
    means for suitably operating said leak drain valves to drain water under pressure from the chamber defined between the outer periphery of the runner and the guide vanes during spinning reserve operation.

2. A spinning reserve device for a water-wheel as claimed in claim 1 further comprising at least one leak drain pipe opening in a lateral pressure chamber defined between said runner and the lower cover, and a leak drain valve mounted in said leak drain pipe.

3. A spinning reserve device for a water-wheel as claimed in claim 1 wherein said plurality of leak drain pipes open in a draft tube on the underside of the runner.

4. A method for draining leakage water for a water-wheel comprising a runner of the Francis type, an upper cover in spaced juxtaposed relationship with an upper surface of the runner, a lower cover in spaced juxtaposed relationship with an underside of the runner, and a plurality of pivoted guide vanes arranged on the outer periphery of the runner for the entire circumferential extent, including the steps of closing the pivotal guide vanes to define a closed chamber about the runner,
    draining leakage water through a plurality of pipes in communication with the upper cover interposed between the outer periphery of the runner and the guide vanes, and
    controlling valves in each of the pipes to drain water under pressure from the chamber defined between the outer periphery of the runner and the guide vanes during spinning reserve.

5. A method according to claim 4, wherein the step of draining leakage water includes draining through at least one pipe communicating with a lateral pressure chamber defined between the runner and a lower cover.

6. A method according to claim 4, wherein the step of draining leakage water includes draining the water to a draft tube on the underside of the runner in communication with the pipes.

* * * * *